Sept. 26, 1961     E. C. JOHNSON ET AL     3,002,115
ELECTRICAL SYSTEM FOR CONTROLLING MOVEMENT OF OBJECTS
Filed Aug. 22, 1957                       6 Sheets—Sheet 2

| RECIRCULATION CYCLE | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| SHIFT PERIOD | $T_2$ | X | | X | | X | | X | | X | | X | | X | | X | |
| | $T_3$ | | X | | | | X | | | | X | | | | X | | |
| | $T_4$ | | | | X | | | | | | | | X | | | | |
| | $T_5$ | | | | | | | | X | | | | | | | | |
| | $T_6$ | | | | | | | | | | | | | | | | X |
| | $T_7$ | | | | | | | | | | | | | | | | |
| OUTPUT FOR .010100... (21 BITS) MULTIPLICANT | | X | | X | X | X | | X | | X | | X | X | X | | X | |

INVENTOR.
E. CALVIN JOHNSON
BY YU CHI HO

*Vett Parsigian*
ATTORNEY

FIG 5

Sept. 26, 1961  E. C. JOHNSON ET AL  3,002,115
ELECTRICAL SYSTEM FOR CONTROLLING MOVEMENT OF OBJECTS
Filed Aug. 22, 1957  6 Sheets-Sheet 6

FIG- 8

TIMING PULSE RATE TO FEED RATE COUNTER=C,
X COMMAND NUMBER = X

| EXAMPLE | 1 | 2 | 3 | 4 | 5 |
|---|---|---|---|---|---|
| FEED RATE NUMBER | 11111..... (17 PLACES) | 11111..... (18 PLACES) | 1000..... (19 PLACES) | 11111..... (19 PLACES) | 11111..... (21 PLACES) |
| FEED RATE NUMBER TREATED AS | .01111.... | .11111..... | .1000..... | .11111..... | .11111..... |
| FEED RATE MULTIPLIER OUTPUT RATE (C.P.S.) | C.01111.... | C.11111..... | C.10000..... | C·.11111..... | C·.11111..... |
| X COMMAND MULTIPLIER OUTPUT RATE | X·C·.0111..... | X·C·.1111..... | X·C·.1000... | X·C·.1111.... | X·C·.1111.... |
| PULSE DOUBLER MULTIPLICATION FACTOR | 1 | 1 | 2 | 2 | 8 |
| PULSE DOUBLER OUTPUT RATE | X·C·.01111.... | X·C·.11111.... | 2·X·C·.100.... | 2·X·C·.1111.... | 8·X·C·.1111.. |
| X COMMAND NUMBER TREATED AS | X | X | $X/2$ | $\frac{X}{2}$ | $\frac{X}{8}$ |
| NUMBER OF OUTPUT PULSE FROM PULSE DOUBLER TO E.R. (A WHOLE NUMBER) | X | X | X | X | X |
| RATIO OF RESULTANT PULSE RATE FROM PULSE DOUBLER | 1 | 2 | 2 | 4 | 16 |

FIG- 9

INVENTOR.
E. CALVIN JOHNSON
BY YU CHI HO

ATTORNEY

United States Patent Office

3,002,115
Patented Sept. 26, 1961

3,002,115
ELECTRICAL SYSTEM FOR CONTROLLING MOVEMENT OF OBJECTS
Ewell Calvin Johnson and Yu Chi Ho, Royal Oak, Mich., assignors to The Bendix Corporation, a corporation of Delaware
Filed Aug. 22, 1957, Ser. No. 679,677
16 Claims. (Cl. 307—149)

This invention relates to a continuous cutting tool position control system for machine tools and more particularly to a digital position control system which operates directly from numerical data.

Control systems which receive numerical data prepared from drawings of parts and which act to control the position of a cutting tool through non-linear paths in order to produce the parts represented on the drawings are well known. In one particular type of system the numerical data is introduced to the tool controller in the form of a punched or magnetic tape. The controller includes a first unit which generates a series of pulses of uniform amplitude and length at timed intervals with respect to one another in accordance with instructions contained on the tape. These pulses are then introduced into the second unit of the system, a digital servomechanism which produces a discrete movement of a mechanical output device such as a machine tool lead screw for each pulse which is received. The number of pulses received by the servomechanism determines the total distance through which the cutting head moves while the rate of pulse introduction to the servomechanism determines the rate of cutting head movement. The tape may carry several information channels each of which acts through a separate servomechanism to control a different machine axis.

The present invention relates to such a system. One aspect of the novelty of the present invention lies in the provision of a unique system for receiving numerical data and providing from that data a series of output pulses which are so timed with respect to one another and which add up to such numbers over particular periods of time that the digital servomechanism associated with the system moves at particular rates through particular distances which are commanded by the numerical data. The present invention also presents novel aspects in the manner in which the pulse producing unit combines with the data preparation unit and the digital servomechanism, in the manner in which the numerical data may be presented to the pulse producing unit, and in the form that the numerical data takes.

The pulse producing unit which forms a part of the present invention makes use of multiplier units which accept the numerical data and provide output signals taking the form of a pulse train in which the number of pulses and their time relationship to one another are functions of the input data. These multiplier units are built around serial recirculating registers that store the numerical data and make it available to the computation process in a simple and economical manner.

The pulse producing units act upon the numerical data they receive in such a manner as to provide signals for the servomechanisms which cause them to produce two or more dependent movements at rates which make the resultant tool movement as specified for the particular section of tape.

It is, therefore, an object of the present invention to provide a digital control system which accepts data in numerical form and provides position control over the cutting tool of a machine in accordance with orders contained in the numerical data.

Another object is to provide a device which accepts numerical data in coded form and which provides a pulse train as its output, the pulse train varying in number of pulses and in timing of pulses in accordance with information contained in the input data.

A further object is to provide a unit which produces pulse trains in accordance with numerical data which utilizes recirculating registers as a storage and computation element, whereby the economies of such storage registers may be utilized in continuous position control systems.

Another object is to provide a continuous position control system which will control the speed of several axes in such a manner as to make the resultant movement of a tool along such axes occur at any specified rate.

Other objects, advantages and applications of the present invention will be made apparent by the following detailed description of the particular embodiment of the invention. The description makes reference to the accompanying drawings in which.

The embodiment of the invention will first be described in rather general, functional terms with reference to the block diagram of FIGURE 1. A more complete operational description of the same embodiment will then be made with reference to FIGURE 6.

The particular embodiment of the invention which will be described controls the motion of a cutting tool 10 of a milling machine generally indicated at 12, along three mutually perpendicular axes. However, it is to be understood that the system to be described is applicable to continuous position control of any object along any number of axes.

In the machine illustrated relative motion between the cutting tool 10 and the workpiece 14 is achieved by moving the workpiece 14 along a first axis X, and by moving the cutting tool along two axes Y and Z which are perpendicular to each other and to X. The machine components are moved by lead screws 16 which are positioned along each of the three axes. The screws 16 are powered by servo motors 18, 20 and 22, respectively. These motors represent the output of the position control system.

The input to the system takes the form of a flexible tape 24 which is coded with a series of holes. The tape might also be magnetically coded in which case a magnetic tape reader would be required. A section of the tape is shown in detail in FIGURE 2. The tape is coded in the binary notation so that a hole in the particular point indicates that a "one" is associated with that position while the absence of a hole in a particular point indicates that a "zero" is associated with a particular position.

The numbers to be communicated to the positioning system are disposed in longitudinal rows along the tape.

Five of such numbers are entered next to one another across the width of the tape.

The tape reader 26 operates upon one transverse row of information at a particular time. It thus reads one significant bit in each of the five different numbers. For the purposes of the present embodiment three of the five numbers to be fed to the positioning system will be considered to have 21 significant figures and a twenty-second figure which indicates the sign of the number. The fourth number has 21 significant binary figures. The fifth number has only one significant figure. Thus, 22 transverse rows of information contain five complete numbers.

One of these numbers expresses the total movement required for the X axis control in a particular time interval; another row represents the total amount of the Y servo during that time interval, and the third axis similarly controls the total length of the Z movement. A fourth row indicates a feed rate number which along with the first three position numbers, controls the speeds at which the motions along each of the three axes are to be carried out. A fifth row is normally empty for 21 of its positions and only contains a punched hole in the 22nd position to indicate the end of one particular block of information containing the four other numbers.

The numbers representing the movements along the X, Y and Z axes during the particular time may be calculated directly from a blue print of the part to be cut or they may be coded onto the tape by a digital computer which has as its input certain information about the part which is to be cut. The latter procedure allows the tedious and time consuming job of determining long series of closely spaced coordinate points to be placed upon a computer which can perform the necessary computations in a much quicker time than could be done by hand.

The fourth row of information representing the feed rate at which a particular movement is to be performed is easily calculated from a knowledge of the optimum cutting rate along the part as determined by the physical conditions such as the material being cut and the type of cutting tool being used, and the necessary resultant movement of the cutting tool as calculated from the three component movements.

The operation of the control system in relation to the machine is such that the tool will be controlled to cut a straight line path through a distance equal to the resultant of the three coded motions at a rate which is a function of the coded feed rate.

Each set of five numbers is termed a block of information. A complete tape includes a number of blocks which, when taken in sequence, control the motion of the cutting tool through the cutting of a complete part.

The tape reader, temporary storage, and start-stop control 26 contains controls for reading the digit associated with one particular significant position in each of the four numbers coded on the tape, entering those digits into each of four temporary storage registers and moving the tape to the next position so that the next digits may be read. When a position has been reached in which a "one" appears in the end of the block line the machine will have entered one complete block containing four words of 21 digits each into the four temporary storage registers. At this point the tape reader stops and maintains the information in the temporary storage registers until other portions of the machine signal that the data should be entered into the active storage registers.

The temporary storage registers are of the serial shift type using magnetic cores and they hold 22 digits.

Magnetic registers are known to the art and are described in IRE Convention Record 1953 on Electronic Computers. The temporary storage section of the present device comprises four of these registers, one for each of the three movements commands and a fourth for the feed rate, and three bistable multivibrators for storing the signs of the command numbers. The signals from the tape are entered into these registers by applying pulses indicative of one digit at a time to their inputs as read from a transverse line on the tape and then applying shift pulses to the registers and moving the tape to bring the next line under the reader. When the tape reader reaches the last line in a particular block of information the end of block digit contained in that last line will actuate a start-stop control contained in the tape reader 26 to halt the reading.

The signs of the motion numbers are contained on the same transverse line as the end of block signal and are fed into three single multivibrator storage units.

When the reader stops, the numbers are maintained in the temporary registers until a signal from the remaining portion of the machine indicates that the last block of information fed to the machine has been completely utilized. At that point the start-stop control connects the outputs of each of the four temporary registers to the inputs of four active registers.

The X, Y and Z temporary registers within the reader 26 are respectively connected to magnetic core recirculating registers contained in the X command register 30, the Y command register 32 and the Z command register 34. These command registers are contained in the command multiplier 44. The feed rate temporary storage register is connected to a magnetic core recirculating register contained in the feed rate multiplier 28.

In order to accomplish the transfer of the numbers from the temporary to the active registers, the shift coils of the temporary storage registers are actuated simultaneously with the actuation of the shift coils of each active register. Twenty-two such shifts act to transfer sequentially each digit of the numbers from the temporary registers to the active register.

The magnetic registers used throughout the preferred embodiment are of the recirculating type. When the output terminals of a magnetic core register are connected to the input terminals a recirculating register is formed, such that a number entered into the register will continue to pass through and re-enter the register as shift pulses are applied, as long as no new signals are entered into the input and the output to input connection is not disturbed.

It is apparent that if a number is contained in a recirculating register in a particular order and position, after a number of shifts equal to the number of cores in the register the number will have returned to its original position. In the following description such a number of shifts will be termed a recirculation cycle. A recirculation cycle will be understood to have its beginning when the least significant digit in the number is positioned in the first coil in the register; that is, the first core to which a number proceeds when it is admitted to the register.

These shift pulses are produced by a shift pulse generator 36 which is fed from a clock pulse generator 38. The clock pulse generator is a free running multivibrator which acts as a pulse source for the entire machine. The shift pulse generator acts to provide pulses which are slightly delayed with respect to the pulses of the clock generator. The reason for this delay will appear subsequently.

The clock generator 38 also feeds a timing generator 39 which comprises a ring counter. This consists of 22 bistable multivibrators connected in series so that they change state in sequence. The last multivibrator is connected to the first so that they act as an endless chain. "And" gates which have their second input from the clock generator form the connecting elements between the units so that the ring operates in synchronism with the clock. Outputs from each of the 22 multivibrators are used at various points in the system.

Each of the outputs is termed "T" with a subscript indicating its position in the clock train. Thus the first multivibrator in the train provides a $T_1$ pulse on its output line each time it changes from a first state to a second. On the next clock generator pulse the next multivibrator changes state and provides what is termed a "$T_2$" pulse on its output line.

One of these timing pulses from the timing generator serves as a second input for the feed rate multiplier 28. The multiplier 28 performs the function of multiplying the number of clock pulses received in a particular time by a fractional number which is expressed in binary form in the number contained in the feed rate active register. The output of the feed rate multiplier constitutes a train of identical pulses, fewer in number than the timing pulses and proportional in number to the product of the number of timing pulses supplied to the feed rate multiplier during a given period and the feed rate number contained in the active storage register of the feed rate multiplier. The pulses of this output train are approximately linearly spaced over the time period of the multiplication.

The feed rate multiplier 28, in effect, controls the pulse rate at which the subsequent circuitry operates. The mechanism of such a multiplier is disclosed and claimed in copending patent application Serial Number 633,569, by the present inventors, filed on January 11, 1957, and will be described subsequently.

The pulse train which constitutes the output of the feed rate multiplier is applied to a synchronizer 40. The synchronizer also has as inputs the outputs of the three command active storage registers 30, 32 and 34. The synchronizer 40 acts to delay a pulse received from the feed rate multiplier until the first shift period in a recirculation cycle in which a "one" emerges from any of the command storage registers. It then provides an output pulse.

The three command numbers are placed in the command registers with their least significant digit in the first core; that is, the first core a digit goes to on being fed into the register. Therefore, their most significant digit is at a core in the register which depends on the length of the number. As the register is shifted this most significant digit emerges at the same shift period in every recirculation cycle.

If two pulses arrive from the feed rate multiplier before the occurrence of the first output from one of the active command registers, as may occur under certain circumstances, the synchronizer stores one pulse until a period during which no pulses arrive from the feed rate multiplier between two sequential occurrences of the first "one" from one of the command registers, and then emits the stored pulse.

This synchronization is performed in order to accommodate the multiplication processes to the length of the various movement numbers. The exact mechanism which creates this requirement will be subsequently clarified.

The pulse train which represents the output of the synchronizer is fed to a command counter 42 which is one of the units of the command multiplier generally indicated at 44. The multiplier, taken as a whole, has as its input the pulse train which is the output of the synchronizer and the three command numbers X, Y and Z, which are fed to the X register 30, the Y register 32 and the Z command register 34. The command counter acts in cooperation with the three command registers to multiply the input pulse trains from the synchronizer 40 by fractions which are expressed in binary form in the numbers contained in the three command counters.

The command multiplier thus has three outputs, one of which is a pulse train containing a number of pulses proportional to the number of pulses in the input train multiplied by the fraction represented in binary form in the X command register, a second train which contains a number of pulses proportional to the number of pulses contained in the input pulse train multiplied by the fraction represented in binary form in the Y counter, and a third output pulse train containing a number of pulses proportional to the number of pulses contained in the input pulse train of the synchronizer 40 multiplied by the fraction represented in binary form in the Z command register. The pulses in each of these output trains are spaced in time with respect to one another in approximately linear manner. The command multiplier also contains circuitry for determining when a sufficient number of output pulses have been provided to cause the following tool control to move through the required distance. This number is determined by the longest of the three command numbers. Since the three command registers produce output pulse rates which are in the same ratio to one another as their respective command numbers, when one command register has put out a number of pulses equal to its command number the other two registers also have. In this manner the feed rate numbers determine the rate of pulses which each of the following digital servomechanisms will receive.

Each of the three outputs of the command multiplier is applied to the pulse doubler 45 which multiplies each of the pulses contained in the three pulse trains by either 1, 2, 4 or 8, depending upon the condition of an input which the pulse multiplier has from the feed rate multiplier 28. Thus, if the input from the feed rate multiplier 28 indicates that each pulse should be multiplied by 4, for instance, four output pulses will be provided on the X multiplied command pulse line for each one pulse which enters on the X command pulse line and each of the outputs on the Y and Z multiplied command pulse line will also carry four times the number of pulses received in the Y and Z command pulse line.

As has been noted the feed rate number is stored in the active register of the feed rate multiplier with the least significant figure occupying the core position which emerges from the register at the last shift period in a recirculation cycle. Thus, the position of the most significant figure in the register varies with the number of significant figures contained in the feed rate number. As a logical consequence of this method of retaining numbers in the register, the shift period in a given recirculation cycle in which the most significant digit leaves the register is a direct function of the number of significant digits in the feed rate number.

Using this principle to detect the length of a feed rate number it is possible to treat the number contained in the feed rate register as being independent of the number of digits contained in it for purposes of the multiplier and feed rate multiplier and later correcting for the error which thereby occurs by multiplying the products of the command register by a suitable power of 2.

Thus, for the purposes of the feed rate multiplier, numbers which contain 18, 19 and 20 or 21 places are all treated as if their binary point is immediately to the left of its most significant digit. If the first "one" occurs at some place after the 18th digit the number is treated in the same manner as an 18 digit number. Then, for all numbers which contain 18 digits or less the pulse doubler provides one output pulse for each one input pulse received from the command multipliers. For each 19 digit number the multiplier provides two output pulses for each input pulse. Similarly, for 20 or 21 digit feed rate numbers respectively the pulse multiplier provides four and eight output pulses for each input pulse.

However, it has been previously noted that a particular command number represents the total number of pulses which the error register must receive in order to produce the particular desired motion. Therefore, whenever the pulse doubler, which follows the command multiplier, is acting to add pulses into the final command train it is necessary to adjust each of the command numbers accordingly. Thus, when the pulse doubler is multiplying the number of pulses which it receives by 2 it is necessary to divide each of the command numbers by two in order to arrive at a number of final, multiplied command pulses which are equal to the three command numbers.

This operation of dividing the command numbers by the same factor which the pulse doubler is multiplying the command pulses is simply performed by treating each of the command numbers as if it had one less binary digit than it actually contains for each multiple of two by which the pulse doubler is multiplying the command pulses. If the pulse doubler is multiplying each command pulse by providing two output pulses for each input pulse it receives, each of the three command numbers is treated as if it contained one less digit than it actually does. Similarly, if the pulse doubler is providing 4 or 8 output pulses for each input pulse it receives, the last 2 or 3 digits respectively of each of the command numbers are eliminated. This is the binary equivalent of dividing a decimal number by 10 by treating it as if it contained one less digit than it does, e.g., treating 100 as 10 divides it by 10; treating the binary 110 as binary 11.0 divides it by 2.

This is done so that the relatively complex, logical circuitry of the feed rate multiplier and the command multiplier will be operating at a pulse rate well within its capabilities. Thus, the maximum pulse rate which occurs in the feed rate multiplier and the command multiplier is only ⅛ as high as the maximum possible output of the pulse multiplier.

Figure 9:
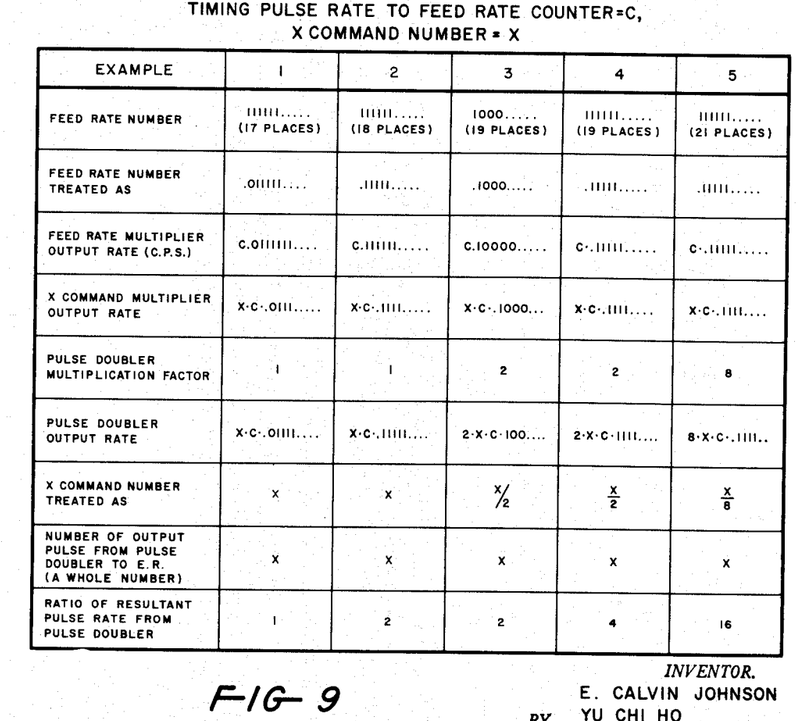
FIGURE 9 is a chart clarifying the operation of the pulse producing section.

FIGURE 9 illustrates the method of operation of the pulse producing circuitry for 4 different feed rate numbers. When a 17 place feed rate number is utilized as in Example 1 the feed rate number is treated as a binary fraction with a zero immediately to the right of the binary place. When the feed rate number contains 18 or more places as in Examples 2, 3, 4 and 5 the binary place is considered to be immediately to the left of the most significant digit.

With an input to the feed rate multiplier from the timing pulse generator of C cycles per second the feed rate multiplier provides an output of C times the feed rate number (taken as a binary fraction) cycles per second. Each of the three command multipliers then provide outputs of the command rate number (taken as a binary fraction) times the input from the feed rate multiplier. These output pulses from the command multipliers are fed to the pulse doubler where in Examples 1 and 2 in which the feed rate number contains 18 places or less, one output pulse is provided for each input pulse received, and in Examples 3 and 4, with the feed rate numbers containing 19 places, two output pulses are provided for each input, and in Example 5 with a 21 place feed rate number 8 output pulses are provided for each input pulse received.

In Examples 3 and 4 since the pulse doubler operates to multiply the number of pulses received by two the X command numbers are treated as if they contain one less digit than they actually contain, or to say the same thing in another manner, as if they were half as large as they are. This effectively causes the multiplication process to stop when only half the number of pulses have been received by the various command multipliers as they would receive if the command number were treated as a whole number. Since this half number of output pulses is later doubled the resultant output from the pulse doubler to the error register is equal to the numbers contained in the various command numbers. Similarly, in Example 5 three digits are removed from the command number to effectively divide it by a factor of eight, so the output is still the same as the command number. However, these numbers of pulses are provided in periods of time which vary as a function of the feed rate numbers, which is the ultimate purpose of the system.

The output of the three pulse doublers are fed to three digital to analogue computers which are well known to the prior art. These units all have a common function of moving an output device through a distance which is a function of the number of pulses which are fed into them in a particular time period, the movement of the motor occurring at a rate which is proportional to the rate of input of the pulses. One type of digital servo unit will be described in detail in the following description.

The digital servos also have inputs from the input section. These inputs are indicative of the signs of the movements commanded by the output of the pulse multiplier as are coded in the last row in a block of tape. A "one" on the sign line indicates movement in a first direction and the absence of a one indicates movement in a second direction.

The input section 26 has an additional input from the command counter 42 which signals the end of a cutting interval (the overflow of a command counter register) so that the active storage registers may be connected to receive the next block of information from the temporary storage registers.

Figures 1, 2:
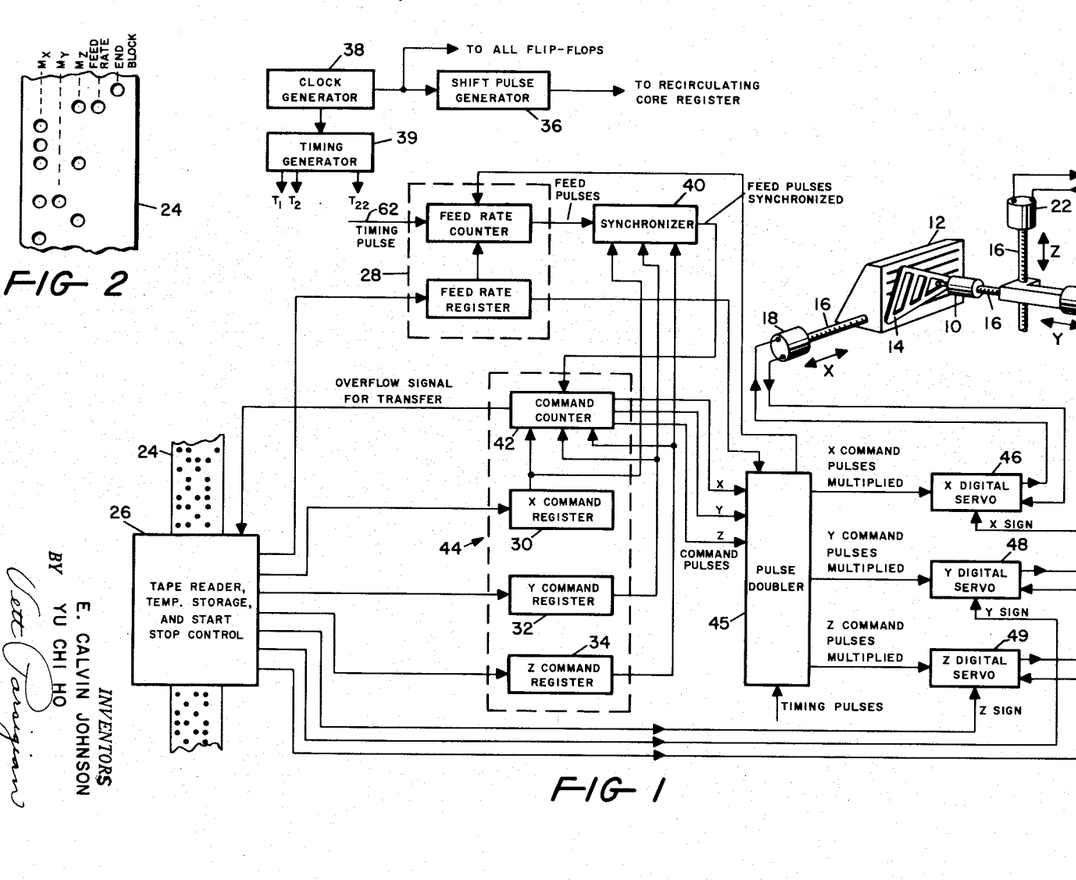
FIGURE 1 is an elementary block diagram of the control system of the preferred embodiment.
FIGURE 2 is a view of a portion of the tape used in control systems.

From a study of FIGURE 1 it may, therefore, be seen that the machine tool position control system consists largely of the following units and their control apparatus:

(1) Means for reading each of the four columns on the tape and for temporarily storing the four numbers contained therein;

(2) Means for generating a train of identical pulses at regular intervals with respect to one another (the timing pulse generator);

(3) Means for multiplying this uniform pulse train by one of the numbers removed from the tape so as to provide an output feed train which provides pulses at a lower rate than the input pulse train, these pulses being spaced at approximately uniform intervals with respect to one another;

(4) Means for multiplying this feed pulse train by three other fractional quantities also taken from the tape so as to produce three command pulse trains at rates which are in the ratio of the three fractional quantities, and for halting the multiplication process when numbers of pulses have been provided on each output which are equal to or regular divisions of the three command numbers, this division factor being determined by the length of the feed rate number.

(5) Means for multiplying the three command pulse trains by powers of 2 which are determined by the number of significant digits contained in the feed rate number;

(6) Three digital servomechanisms which have the multiplied command pulse trains as their inputs and which drive three output motors in accordance with the number of pulses in the command pulse trains at velocities determined by the rate of input of command pulses.

In the drawings referred to in the following description, bistable multivibrators are shown schematically as small rectangles. All of the multivibrators have two inputs and function in the following manner. When an input on one side, such as the left input, goes high, the opposite output line, i.e. the left output, goes high and remains in that state until the other input line, i.e. the right input, goes high and causes the output states to reverse.

*Tape reader and temporary storage*

Figure 7:
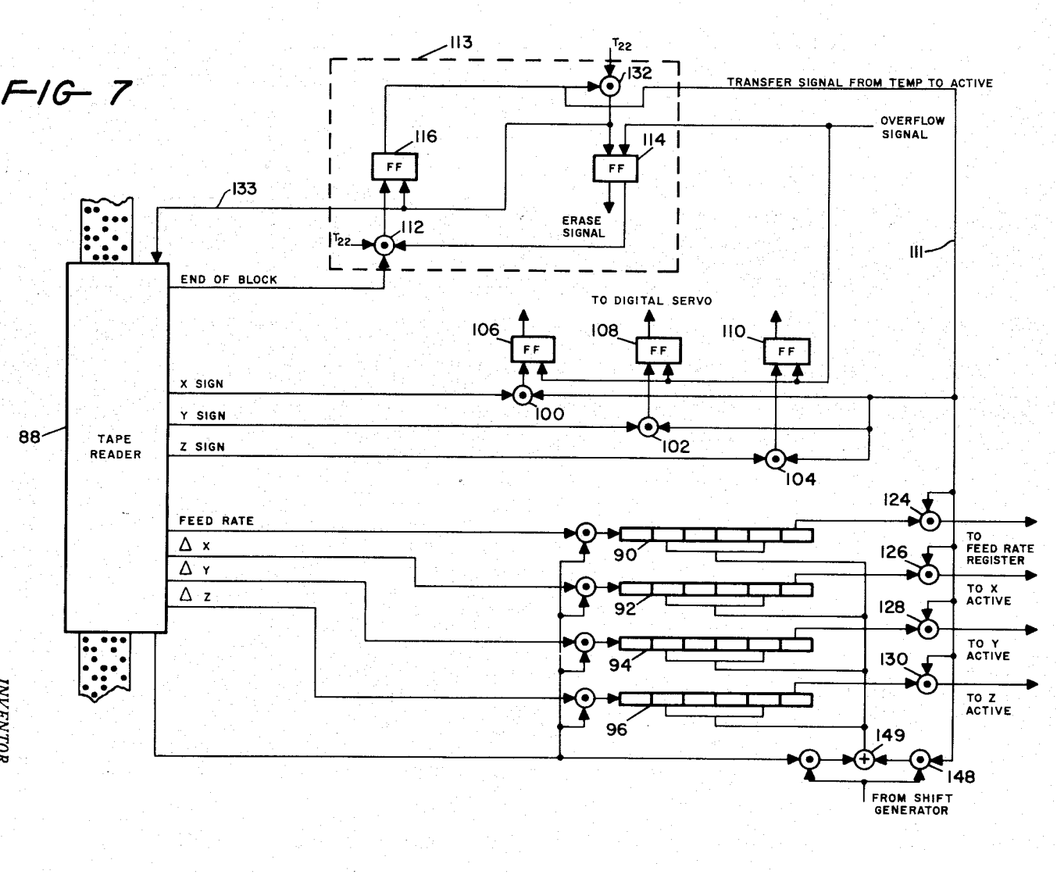
FIGURE 7 is a logical schematic diagram of the temporary data storage and control unit.

The tape reader, temporary storage unit and their associated control circuitry, all of which are shown collectively as 26 in FIGURE 1, are shown in logical detail in FIGURE 7. The tape reader 88 comprises an electromechanical unit which determines the presence or absence of holes in particular locations on the tape, provides voltages indicative of the presence or absence of these holes, and moves the tape so as to read successive traverse rows of holes.

The tape reader 88 provides nine output lines. Three of the output lines indicate the particular digits in the three motion numbers $M_x$, $M_y$ and $M_z$; another three output lines indicate the signs of the three motion numbers; the seventh line indicates particular digits of the feed rate number; the eighth line provides a signal when the end of the block is reached, and the ninth line provides a shift signal for shifting the contents of the temporary storage registers in synchronism with the movements of the reader.

Assuming a beginning of operation for the device with all of the storage registers empty and the tape reader 88 positioned over the first traverse row of holes in a particular block of information on the tape, the tape reader begins by providing signals on the $M_x$, $M_y$, $M_z$ and feed rate lines indicative of the presence or absence of a hole in the particular positions on the tape. If a hole is present a relatively high voltage, such as 10 volts, is provided on the particular output line associated with that hole. If no hole is present, a zero voltage is provided on the particular output line. The tape reader then provides a pulse on the shift line which causes the signal carried on the various input lines to be admitted to the first stages of the temporary storage registers 90, 92, 94 and 96. Then the reader 88 physically moves the tape so as to bring the next traverse row of information under its surveillance. Signals indicative of the holes in this second row appear on the four output lines, $M_x$, $M_y$, $M_z$ and feed rate. Another shift signal is provided to cause that information to be entered into the temporary storage registers 90, 92, 94 and 96.

This process is continued for the first 21 traverse rows of information in the particular block being read. When the 22nd row of information is reached, as is indicated by the presence of a hole in the end of block line, the tape reader provides output signals on the end of block line, and the sign X, sign Y and sign Z lines. The signs occupy the last position in the lines indicating their respective numbers. These signals are not shifted into the temporary storage register but are fed to three multivibrators upon receipt of a signal from the control section.

These three sign lines are fed to three "and" gates 100, 102 and 104, which respectively connect to the input of three flip-flops 106, 108 and 110. The qualifying contacts on each of the "and" gates 100, 102 and 104 are connected to a "transfer" line 111 which admits the sign signals to the flip-flops when the new block of information is being fed to the active registers. The flip-flops 106, 108 and 110 have as their second inputs a line from the command counter 42 (FIGURE 1) which indicates that the controller portion of the circuitry has completely utilized the block of information which was previously fed to it. This signal resets the flip-flops. The production of this signal will be described subsequently.

The left outputs of the three flip-flops 106, 108 and 110 are conditioned to indicate a positive sign for the motion numbers when high. When a negative sign is present the left outputs are low.

The end of block line connects to one terminal of an "and" gate 112 which has an input from the timing generator 39 which goes high during the last shift period in every recirculation cycle (termed the $T_{22}$ pulse) and an input from the right output of another flip-flop 114. These units are located in the transfer control 113. The right input of the flip-flop 114 which conditions the right output is actuated by the pulse which indicates overflow of the command counter 42 (FIGURE 1). Thus, the output of the "and" gate 112 is high when the end of a block is reached, $T_{22}$ is reached and the command counter overflows indicating that the previous block of information has been completely utilized. When these three conditions are met, a pulse is provided to the left input of a multivibrator 116.

The left output of the multivibrator 116 which provides the previously discussed output on line 111 then goes high and acts as a transfer signal which allows the contents of the temporary storage registers 90, 92, 94 and 96 to be fed respectively to the active storage registers 30, 32 and 34 which are located in the command multiplier 44 and to the active storage register 50 (FIGURE 6) which is located in the feed rate multiplier 28 (FIGURE 1). This transfer is accomplished by opening the "and" gates 124, 126, 128 and 130 which connect the outputs of the temporary storage registers 90, 92, 94 and 96 to the inputs of the active storage registers 30, 32, 34 and 50.

The transfer action continues for a complete recirculation cycle of 22 pulses. On the next $T_{22}$ pulse an "and" gate 132, which has a left output of the multivibrator 116 and $T_{22}$ as its two inputs, feeds the right input of the multivibrator 116 to make its left output go low, thereby ending the transfer action. The output of the "and" gate 132 also resets the multivibrator 114 which conditions the "and" gate 112 and provides a pulse to the tape reader on line 133 which causes the tape reader to begin reading the next block of information. The overflow signal from the command counter 42 (FIGURE 1) also resets the multivibrators 106, 108 and 110, which thereafter maintain the condition of the signals on sign X, sign Y and sign Z lines until the next overflow from the command counter 42.

The right output of the flip-flop 114 is normally high and conditions the erase gates on all the active recirculating registers. When the overflow signal causes the right output to go low the material in these registers is erased.

The transfer signal from the multivibrator 116 also conditions an "and" gate 148 which operates through an "or" gate 149 and connects the shift cores of the four temporary storage registers 90, 92, 94 and 96 to the main output of the shift generator. The "and" gate 148 is conditioned by an output from the shift generator 36. Thus, during the transfer cycle the temporary storage registers contents are being shifted in unison with the contents of the active storage registers which also connect to the shift generator.

Feed rate multiplier

Figure 3:
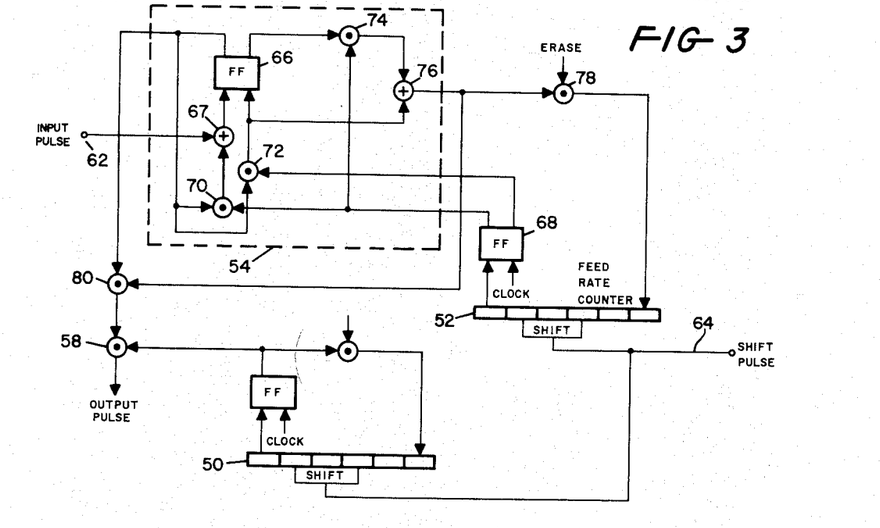
FIGURE 3 is a logical circuit of one of the multiplier units employed in the present embodiment.

Referring to FIGURE 3, the feed rate multiplier 28 is shown in logical detail. The essential units of the multiplier are a first multiplicand register 50 and its associated output flip-flop and erase gate, a second multiplier register 52 and its associated output flip-flop 68 and erase gate 78, an adder unit 54, and a non-carry pulse detector "and" gate 80.

The outputs of these registers, the active storage registers 30, 32 and 34 and the command counter register 90 are through multivibrators which are triggered by the output of the last core in the register at the shift pulse time.

The multiplicand register 50 and the multiplier register 52 are of the recirculating magnetic type. The multiplicand register 50 is initially prepared for a multiplication by the insertion of a feed rate number from the temporary storage register 90 which contains the particular number to be multiplied. As has been noted, this insertion is done by connecting the multiplicand register 50 input terminal to the output temporary storage registers 90 by means of the "and" gate 124 and shifting the storage register and multiplicand registers simultaneously.

When the feed rate number of the multiplicand is completely inserted into the register 50, the multiplication may proceed. This is controlled by the shift pulse line 64 which connects to the shift cores of each of the registers 50 and 52 and the input pulse train line 62 which connects to one of the outputs of the timing generator 39. The particular output which is utilized is dependent upon the length of the command numbers since its choice determines the manner in which the length of the feed rate number is treated. The method used to select the proper timing output will be later described. At this point it is sufficient to know that a pulse is provided on line 62 once during each recirculation cycle and the time in the cycle at which it occurs is fixed for a particular block of information.

As was previously noted, the shift pulses occur in unison with and slightly delayed with respect to the clock pulses. This is so that the output flip-flop of each recirculating register can be reset before the shift pulse occurs.

The adder 54 performs the function of adding this timing pulse into the contents of the multiplier register 52 in binary fashion. Each time a pulse is added into the register 52 the circuit must provide an output at gate 80. This addition time varies from cycle to cycle. For example, suppose pulses are being provided at line 62 each $T_1$ time. The first pulse in a cycle will be immediately added into the register 52 and thus provide an output at gate 80; but the second pulse will find the $T_1$ spot in the register full and it will be necessary for the adder to "carry" the timing pulse over to $T_2$ when it will be added into the register. Therefore, during the second cycle the gate 80 must provide an output at $T_2$ time. In general, the gate 80 must provide an output during the first time in a cycle following the introduction of a pulse on line 62 in which the adder does not "carry." The gate 80 is thus termed the non-carry pulse detector.

In order to accomplish this the pulse is applied to the left input terminal of a bistable multivibrator 66 through an "or" gate 67. The adder also has two inputs from a bistable multivibrator 68 which acts as the output of the recirculating multiplier storage register 52.

These two multivibrators 66 and 68 are connected to an array of three "and" gates 70, 72 and 74. The "and" gate 70 is connected to both left output terminals so as to become high when both an input pulse has been received and a pulse is being put out by the multiplier register 52 in that clock period. The "and" gate 72 is high when an input pulse is being added but no output is being produced by the register, and the "and" gate 74 is high when an output is being provided by the register but no input pulse is being added.

The outputs of both the "and" gates 72 and 74 are summed by an "or" gate 76, which connects to the input of the register 52 through an erasing gate 78 which is normally in an open position and which is only closed when it is desired to erase all the contents of the register 52 following a multiplication. This addition of a pulse whenever a "one" emerges from the register and no input pulse on line 62 is provided or when a "zero" emerges from the register and an input pulse is provided, is in accordance with the elementary laws of binary addition.

The "and" gate 70 provides for the possibility of a one pulse coming out of the register at the same time as an input pulse is received. In accordance with the laws of binary addition a zero must then be placed in the register at this instant and a one must be carried over to the next shift period. The one carry-over is provided by connecting the output of the gate 70 to the left input of the multivibrator 66 is such a manner that a one occurs in the form of an input pulse in the period following the occurrence of the simultaneous input pulse and a one output from the register 52.

The output of the gate 76 which indicates that a "one" is being added into the register also connects to a non-carry pulse detector gate 80. The non-carry pulse detector gate 80 allows the first "one" output of the "or" gate 76 in a given recirculation cycle to pass through and halts all succeeding outputs of the "or" gate 76 in a given recirculation cycle since it has as its other input the left output of the carry flip-flop 66 which is only high up to the time the non-carry pulse appears from gate 76.

This output of the "and" gate 80 is connected to the "and" gate 58 which also has an input from the output of the multiplicand register 50. Since the multiplicand register 50 is shifted in unison with the multiplier register 52, an output is provided by the "and" gate 58 only if the occurrence of a pulse from the "and" gate 80 coincides with the output of a one from the recirculating register 50. The output of the "and" gate 58 represents the output of the entire multiplier unit.

Figure 4:
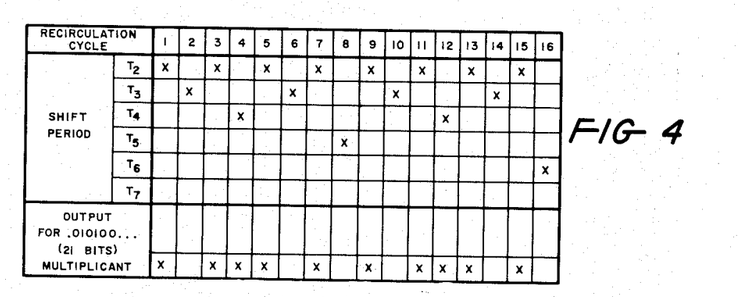
FIGURE 4 is a chart clarifying the operation of the multiplier in FIGURE 3.

FIGURE 4 indicates the operation of the unit multiplier FIGURE 3 for a particular feed rate number or multiplicand input. For the multiplicand illustrated, .010100 . . . (21 digits) the operation is only indicated for the first five shift periods in a given recirculation cycle since for the other shift periods no output will be produced on the gate 58 as only zeros will emerge from the multiplicand register 50.

In the first recirculation cycle a "one" is provided on the adder input line 62 at $T_1$ and a zero emerges from the multiplier register 52 since it is initially empty. Therefore, an output is provided by the "or" gate 76 and since that output of the "or" gate 76 is the first in the particular recirculation cycle being considered an output is provided by the "and" gate 80. Additionally, since a one is the first number to emerge from the multiplicand register 50 an output pulse is provided by the "and" gate 58.

During the second recirculation cycle an input pulse is provided in the second shift period and the one which was added in the last recirculation cycle simultaneously emerges from the multiplier register 52. Therefore, during that period no output is provided by the "or" gate 76 but rather a carry pulse is generated by the "and" gate 70 so that the effect is produced of creating a zero in the first position and providing an input pulse in the third shift period. Since a zero emerges from the register 52 during the third shift period, the carry pulse provides an output at the gate 76 which is allowed to pass by the gate 80 since it is the first output pulse in the particular recirculation cycle. But since a zero occupies the third shift position in the multiplicand register 50 no output is produced by the "and" gate 58. Similarly, during the third cycle the input pulse occurs at the same time as the zero is provided as the output of the multiplier register 52. Therefore, a pulse is passed by the gate 76 and 80 and since a one occupies the second position in the multiplicand chain the "and" gate 58 passes this pulse to the output line.

FIGURE 4 continues this analysis for 16 recirculation cycles. It is to be noted that a pulse occurs during the second shift period on every other cycle, a pulse occurs from the gate 80 during the third shift period on every fourth cycle, a pulse appears on the fourth shift period on every eighth cycle, a pulse occurs on the fifth shift period every sixteenth cycle, etc. The operation of the multiplier depends upon the fact that these pulse occurrences are in relation to the power of 2 to one another.

The number of pulses that occur from the non-carry pulse detector gate 80 simultaneously with the emergence of any particular digit from the multiplicand register 50 bears a relation to the power of that multiplicand digit to the base 2. Therefore, in the example the binary number .10100 is equivalent to .625 in decimal notation or to ten-sixteenths. It is to be noted that during the sixteenth recirculation cycles illustrated an output of ten pulses is provided or the input train of sixteen pulses has been multiplied by the multiplicand of ten-sixteenths to provide an output of ten.

*Input pulse for feed rate multiplier*

It was previously noted that feed rate numbers containing less than 18 digits are treated as 18 digit numbers and feed rate numbers which contain 18 digits or more are treated as containing their true number of digits. From a study of FIGURE 4 it can be seen that this treatment may be accomplished by varying the shift period in which the input pulse to the feed rate multiplier is introduced. In the example shown since the feed rate number contained its most significant digit in the position once removed from the first character in the number, its most significant digit emerges from the multiplicand register at $T_2$. In order to treat this number as a full number it is necessary that the addend pulses be provided at $T_2$. If the addend pulses were provided at $T_1$ they would coincide with the emergence of a zero from the multiplicand register and the number would be treated as .010100 . . . .

To treat a 21 digit number as a full number the addend pulse must be provided at $T_1$. To treat a 20 digit number as a full number the pulse must be provided a $T_2$. To treat all numbers having 18 digits or less as 18 digit numbers the pulse must be provided at $T_4$.

Three bistable multivibrators A, B and C, which are located in the pulse doubler circuitry 45 (FIGURE 6), are so connected as to detect the number of digits in the feed rate number. Their connections will be described in detail subsequently. At this point it is sufficient to know each of the multivibrators left (upper) output condition which is normally low and right (lower) output which is normally high. When a feed rate number contains 18 digits or less all three left outputs remain low. When the number contains 19 digits the A left output goes high. Twenty digits causes both A and B left outputs to go high and 21 digits causes all three left outputs to go high.

Figure 6:
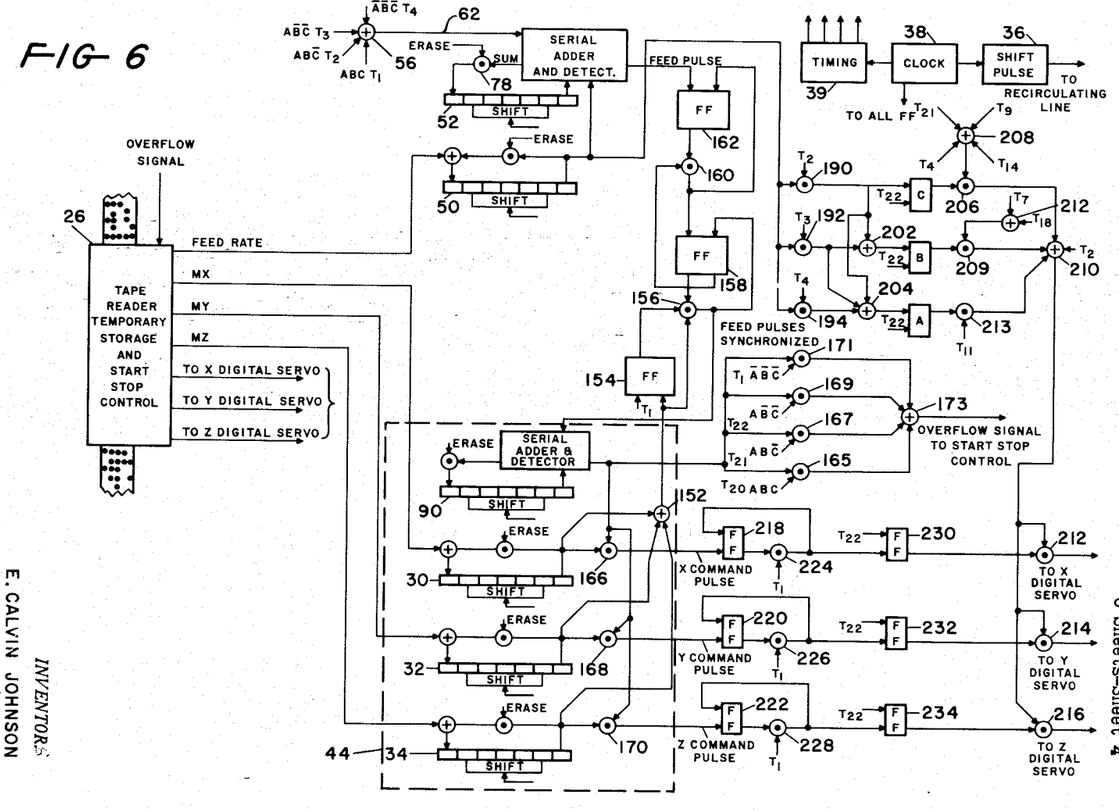
FIGURE 6 is a more detailed logical schematic diagram of the circuitry employed in the particular embodiment described.

The "or" gate 56, shown in FIGURE 6, utilizes the outputs of these three multivibrators to provide the correct input pulse to the feed rate multiplier circuitry. It has four inputs, each of which connects to one of the timing pulse lines and to a combination of the A, B and C multivibrator lines. A particular input is labeled A if it connects to the left output of the multivibrator A and $\overline{A}$ if it connects to the A right output. Thus a $T_4$ pulse appears on the input labeled $\overline{ABC}\ T_4$ when the left outputs of all three multivibrators are low. This occurs when a feed rate number having 18 digits or less is being utilized. Similarly the three inputs labeled $A\overline{BC}\ T_3$, $AB\overline{C}\ T_2$ and $ABC\ T_1$ provide their respective pulses to the carry number so that an equivalent addend pulse will be provided to the feed rate multiplier at $T_3$, $T_2$, $T_1$ time, correspondingly, when the correct combination of multivibrator outputs is present.

Synchronizer

The output of the feed rate multiplier 28 from the "and" gate 58 is thus seen to constitute a series of pulses which occur at relatively regular intervals with respect to one another. The pulses occur at random shift periods within a recirculation cycle but no more than one pulse occurs during any given recirculation cycle. The function of the synchronizer 40 to which these pulses are fed is to provide a series of output pulses equal in number to the input pulses but all of which occur at the same shift period within a recirculation cycle.

The shift period to which these pulses are synchronized is determined by the number of binary digits contained in the longest of the three motion numbers $M_x$, $M_y$ and $M_z$. These three motion numbers are maintained in the active storage registers 30, 32 and 34 with their least significant figure so positioned in the registers as to emerge from the registers at $T_{22}$. Therefore, the length of the longest motion number may be determined by observing the first digit to emerge from any of the three registers during a given recirculation cycle. Thus, if $M_x$ contains 17 significant digits, while $M_y$ and $M_z$ each only contain 15 significant digits, the first "one" to emerge from the three registers during a given recirculation cycle will emerge from the $M_x$ register at $T_5$.

In order to sense the length of the largest motion number the outputs of the three registers 30, 32 and 34 are summed by an "or" gate 152 which has its output to the synchronizer 40 (shown in logical detail in FIGURE 6).

This synchronization is performed so that the time consumed by the multiplication process performed on a single block of information may be tailored to the length of the longest motion member.

Considered in greater detail the synchronizer 40 performs the function of accepting the feed rate pulses from the "and" gate 58 and of storing them until the emergence of the first "one" from either of the three active storage registers 30, 32 and 34 during a given recirculation cycle. At that time it provides an output pulse. Because of the variable time occurrence of pulses from the "and" gate 58, it is possible for two feed rate pulses to be received before the occurrence of the first output from the three active storage registers. Therefore, the synchronizer also provides means for storing one of the pulses from the feed rate multiplier 28 if a preceding pulse has not yet been utilized.

The synchronizer contains three bistable multivibrators 154, 158 and 162. At the beginning of operation the right outputs of each of the three multivibrators are high. A pulse from the "and" gate 58 is emitted to the left input of the multivibrator 162 making its left output go high. This output feeds one input of an "and" gate 160 which has the right output of the multivibrator 158 as its other input. A pulse is, therefore, provided to the left input of the multivibrator 158, making its left output go high.

This opens one input of the "and" gate 156 which has a second input from the right output of the multivibrator 154 and a third input from the "or" gate 152 which senses the outputs of the three active storage registers 30, 32 and 34. Since the multivibrator 154 already has its right output high an output is provided by the "and" gate 156 as soon as the first output pulse in the given recirculation cycle occurs from the "or" gate 152. This pulse returns the multivibrator 158 to its initial state in which its right output is high. If a second pulse should be produced by the "and" gate 58 before the removal of the pulse from the multivibrator 158 the fact that the "and" gate 160 was closed because of the condition of the right output of the multivibrator 158 would cause the second pulse to be stored in the multivibrator 162 until the multivibrator 158 changed state upon the output of a pulse from the "and" gate 156.

The output of the synchronizer 40 thus constitutes a train of pulses no more than one of which occurs in a given recirculation cycle, and all of which occur at the same shift period in the recirculation cycle. It is to be observed that during certain recirculation cycles no output pulse occurs. However, these blank periods are relatively evenly distributed over the pulse train.

Command pulse multiplier

In the command pulse multiplier the feed pulse chain provided by the synchronizer 40 must be multiplied separately by the three motion numbers $M_x$, $M_y$ and $M_z$ to provide three outputs which represent the three motion command pulse chains.

The multiplication system used in the command multiplier is very similar to that used in the feed rate multiplier 28, however, since three products must be obtained, three separate multiplicand registers 30, 32 and 34 are provided. Each of these three registers has an output to an "and" gate 166, 168 and 170. The "and" gates each have an input from the output line of the non-carry pulse detector 172 which operates in association with the multiplier register 90 and the adder 164 to provide the same type of pulse chain that is provided by the non-carry pulse detector 56 and the feed rate multiplier 28.

Figure 5:
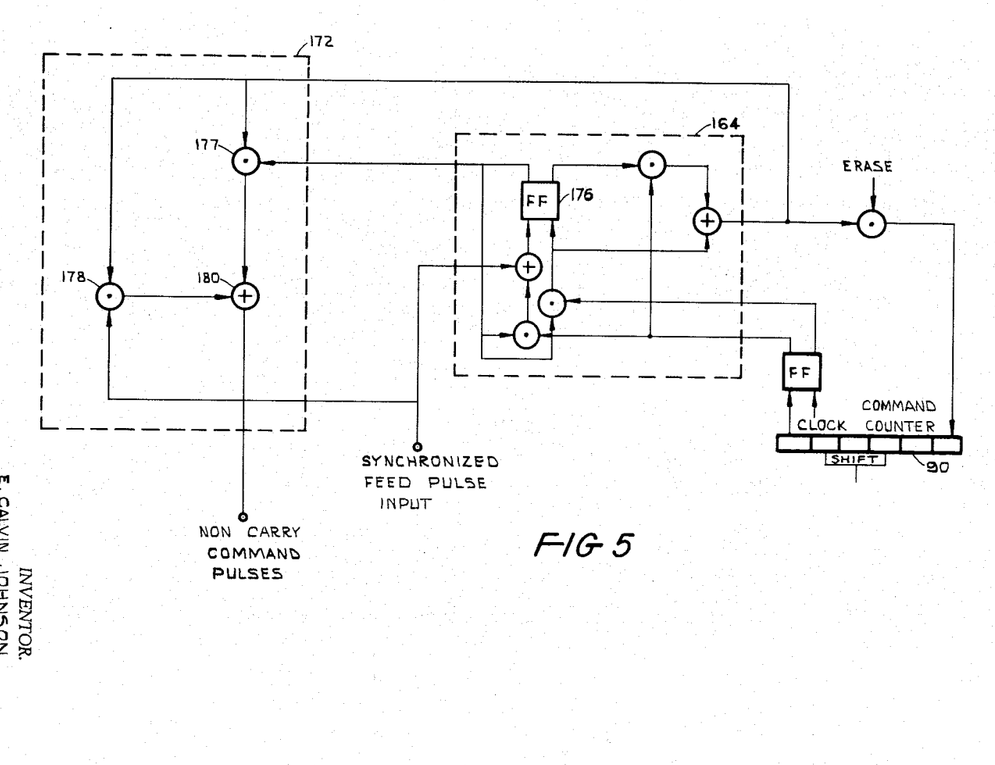
FIGURE 5 is a logical schematic diagram which is a variation of the multiplier of FIGURE 3 which is used in other parts of the logical circuitry.

Because certain recirculation cycles occur during which no input pulse is received from the synchronizer 40, the non-carry pulse detector 172 differs slightly in construction from the non-carry pulse detector 80, however, it performs exactly the same function. That is, it receives the output of the adder 164 which is identical to the adder 54 and detects the first non-carry pulse that occurs in a given recirculation cycle. The logical construction of a non-carry pulse detector 172 is illustrated in FIGURE 5.

Since during certain recirculation cycles the synchronizer 40 does not put out an output pulse, the non-carry pulse detector 172 must provide an output pulse upon the generation of the first non-carry pulse by the adder 164 when and only when a feed pulse has been received from the synchronizer 40 during the same recirculation cycle period. The output from the adder 164 is fed to the input of an "and" gate 177 and an "and" gate 178. The other input to the "and" gate 178 comes directly from the feed pulse line which constitutes the output of the "and" gate 156. Therefore, if a pulse is received from the adder during the same shift period that a feed pulse is generated, that pulse is passed by the "and" gate 178 to the "or" gate 180 which constitutes the output of a non-carry pulse detector.

If a feed pulse arrives before a pulse from the adder 164 it is fed to the "and" gate 177 which has as its other input the left output of the multivibrator 176. This left output is turned on high by input feed pulse and it remains high until after the first output pulse comes out of adder 164. Thereafter it remains low until another input feed pulse is received and no output pulses are issued simultaneously. Non-carry pulses which are produced under this condition are merged with those from gate 178 through "or" gate 180.

The provision of the "and" gate 178 is necessary so that adder pulses which occur simultaneously with the feed pulses will be fed out.

The output of the "or" gate 180 is fed to each of the three "and" gates 166, 168 and 170; therefore, when an output pulse is produced by the "or" gate 180 simultaneously with the emergence of a "one" from any of the three active storage registers 30, 32 or 34 an output pulse is provided on the appropriate motion line.

The output of each of the gates 166, 168 and 170 constitutes a train of pulses, which over the time period of the multiplication, are equal to certain fractions of the pulses fed from the synchronizer 40. Those fractions are determined by the numbers contained in the various active storage registers 30, 32 and 34.

Overflow control

When the command multiplier has put out numbers of pulses on each of its command lines which are equal to the respective command numbers the multiplication process must be halted.

If X is a command number containing N digits the multiplier circuitry will provide X output pulses when it has received $2^N$ input pulses. The multiplication must, therefore, be stopped when $2^N$ pulses (N being the number of digits in the longest of the three command numbers) has been received. Since the multiplier register 90 acts as an accumulator for the pulses added in, $2^N$ pulses have been received when the first "one" occupies the X core in the register where $X=N+P$, P being the time at which the synchronizer provides an input pulse. Since this synchronizer pulse occurs when the first digit of the longest command number emerges from its register the overflow normally occurs when a "one" occurs on the non-carry pulse line at $T_1$. This event may be detected by sensing the output of the non-carry pulse detector 172 at the first shift period.

As was noted in the general description this overflow period may be shortened by a multiple of a factor of two when the pulse doubler 45 is increasing the number of pulses in a train by the same factor of two. This shortening of the overflow period and consequent division of the number of pulses put out by the multiplier is done by sensing the output of the non-carry pulse detector at one period earlier than the last for each factor of two involved. Thus, if the pulse doubler 45 is multiplying its input by four, as it does when the feed rate number contains 20 digits, the feed rate numbers must be divided by four, which is done by sensing an output of the non-carry pulse detector at $T_2$ rather than $T_1$.

The circuitry to accomplish this variable overflow detection is shown in FIGURE 6. The output of the non-carry pulse detector 172 feeds to four "and" gates 165, 167, 169 and 171, each of which has a second input from a combination of the outputs of multivibrators A, B, and C and a timing generator line. If the feed rate number has less than 19 digits no division is necessary and gate 171, which has $T_1$ and $\overline{ABC}$ as inputs provides an output pulse to "or" gate 173 and thence to the control section circuitry. The inputs to the other gates provide their timing signals at the correct time in a similar manner.

Pulse doubler

This unit senses the number of digits contained in the feed rate number and multiplies the X, Y and Z command pulses which are provided at the output of the command multiplier 42 by the power of 2 which is appropriate to correct for the possible variations in length of the feed rate number.

In one form of operation the 18 digit feed rate number might be taken as standard. In that event if the feed rate number did contain 18 digits or less one output pulse would be provided by the pulse doubler on each of three output lines for each command pulse which comes in on the three associated input lines. If 19 digits were contained in the command number, double the number of output pulses would be provided. If the command number contained 20 digits 4 output pulses would be provided for each input pulse; and if the command number contained 21 digits, 8 output pulses would be provided for each input pulse.

The output of the feed rate multiplier register 50 is connected to three "and" gates 190, 192 and 194. The "and" gate 190 has its second input the $T_2$ line; the "and" gate 192 has the $T_3$ line as its second input; and the "and" gate 194 has the $T_4$ line as its second input.

Since the numbers are stacked in the feed rate multiplicand active register 50 in such a manner that their most significant digit emerges first, the gates 190, 192 and 194 test the length of the number. If a one emerges during the $T_2$ period the number is 21 digits long and gate 190 will be opened. Similarly, if a one emerges during the $T_3$ shift period the number is either 21 or 20 digits long and the 192 "and" gate opens. If a one emerges during the $T_4$ shift period, the command rate number is either 21, 20 or 19 digits long and the "and" gate 194 is opened.

The output of the "and" gate 190 connects the left input of three flip-flops A, B and C through a direct connection and through two "or" gates 202 and 204. Similarly, the "and" gate 192 connects to the left inputs of the two multivibrators B and C through the "or" gates 202 and 204 while the "and" gate 194 connects to the left input of the multivibrator A only through the "or" gate 204. Thus, if the command rate number is 21 digits long all three of the multivibrators A, B, and C have their left outputs high. If the number is 20 digits long only the multivibrators 198 and 200 have their left outputs high and if the feed rate number is only 19 digits high only the multivibrator A has its left output high. The multivibrators all reset at $T_{21}$.

The left output of the multivibrator C opens an "and" gate 206 which admits $T_4$, $T_{14}$, $T_{21}$ and $T_9$ pulses accumulated by an "or" gate 208 to a second "or" gate 210. The left output of the multivibrator B opens "and" gate 209 to admit $T_7$ and $T_{18}$ pulses accumulated by the "or" gate 212 to the "or" gate 210. The left output of the multivibrator A similarly admits a $T_{11}$ pulse to the "or" gate 210 through the "and" gate 213.

The "or" gate 210 also receives a $T_2$ pulse directly, therefore, if all three multivibrators A, B and C have their left outputs high, eight output pulses are provided by the "or" gate 210 during each recirculation cycle. If only the multivibrators A and B are open four output pulses are provided by the "or" gate 210 during each recirculation cycle and if only the multivibrator A has its left output high two pulses are provided per recirculation cycle by the "or" gate 210. If all three multivibrators have their right outputs high only one pulse per recirculation cycle is provided by the "or" gate 210.

The output of the "or" gate 210 connects to three "and" gates 212, 214 and 216. The other input to the "and" gate 212 is controlled so as to be high for one recirculation cycle if a pulse output is provided from the X command pulse line during the previous recirculation cycle. Similarly, the "and" gates 214 and 216 are controlled so as to be open for one complete recirculation cycle if an output pulse has been provided on the Y and Z command pulse lines respectively during the previous recirculation cycle.

In order to achieve this, the X, Y and Z command pulse lines are connected respectively to the right inputs of multivibrators 218, 220 and 222, the right outputs of which connect to "and" gates 224, 226 and 228. The other inputs to each of these "and" gates are from the $T_1$ connection of the timing generator. Therefore, if a pulse has been provided for the right input to the multivibrators 218, 220 and 222 during the previous recirculation cycle at $T_1$ the "and" gate 224, 226 or 228 will open causing the multivibrator to close and providing an input to the right side of another multivibrator 230, 232 or 234. This multivibrator will remain open until the $T_{22}$ shift period in the recirculation cycle. During that time it will maintain its associated "and" gate 212, 214 or 216 open. While the "and" gate is open pulses provided by the "or" gate 210 will be placed on the output line of the open "and" gate.

*Digital servos*

The three outputs of the pulse doubler 45 are each fed to one of the digital servos 46, 48 and 49. Each of the digital servos also has an input from the temporary tape reader and storage section 26 which indicates the size of the pulses which it receives at any particular time.

While a digital servomechanism is used in the preferred embodiment of the invention, any form of digital to analog converter which utilizes a train of uniform pulses as its input which provides an output in the form of mechanical motion the instantaneous velocity of which is proportional to the rate of introduction of the pulses and the total displacement of which is a direct function of the number of pulses received may be utilized. Such a device might be a pulse actuated stepping motor appropriately geared to provide the desired output motion.

However, in the present embodiment in order to achieve a smoother motion at more rapid rates than could be achieved with the stepping motor a digital servomechanism of a type described in patent application No. 525,524, filed on August 1, 1955, is utilized. Since the device is described in complete detail in that application it will only be described in functional terms here.

Figure 8:
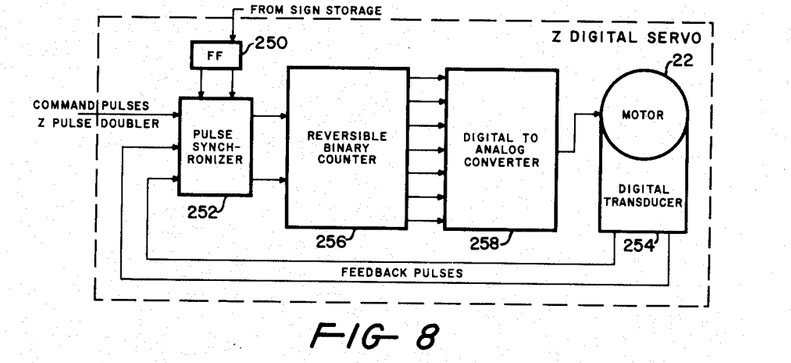
FIGURE 8 is a block diagram of the digital servo unit; adn

Referring to FIGURE 8 the output of the pulse doubler is fed to a pulse synchronizer 252, which also has two inputs from the outputs of a multivibrator 250. One of the inputs of the multivibrator 250 is connected to the sign storage. When a "one" is contained in the sign storage indicating that the pulses from the pulse doubler are of a particular sign one of the outputs of the multivibrators 250 is high. When a "zero" is present in the sign storage indicating that the output of the pulse doubler is of the opposite sign the other output of the multivibrator 250 is high.

The pulse synchronizer 252 also has two inputs from a digital transducer 254 which is mechanically connected to the Z output motor 22. The digital transducer performs the function of providing output pulses on one of the two lines which are numerically proportional to the motion of the motor 22. The particular output line on which they are provided is dependent upon the direction of the motion of the motor 22. If the motion is in a first direction an output is provided on one line of the digital transducer and if the motion is in the other direction the output is provided in the other line.

The pulse synchronizer 252 has two outputs which connect to a reversible binary counter 256. The pulse synchronizer introduces the command pulses to the reversible binary counter 256 upon an input line which is indicative of their sign. It also introduces the feedback pulses on one of these same two lines depending on their sign. The construction of the reversible binary counter is such that only one pulse can be introduced at a particular instant. Therefore, the synchronizer delays command pulses when they occur simultaneously with feedback pulses.

The reversible binary counter 256 is of the standard type described in patent application Serial No. 525,524. Inputs on one of its lines act to add numbers into the counter while inputs on the other line act to subtract numbers from the counter.

The reversible binary counter 256 has a plurality of lines connecting to digital to analog converter 258. This converter constitutes a resistance-voltage network which provides an output voltage which is proportional to the number contained in the reversible binary counter 256. This output voltage energizes the motor 22 which rotates at a velocity which is proportional to the output voltage of the converter 250. Thus, the motor 22 moves at a velocity which is proportional to the number contained in the binary counter 256. Since that number is proportional to the difference between the movements ordered by the command pulses and the motion of the motor as indicated by the feed back pulses the motor is always energized by a voltage which is proportional to the total error in its movement. Although at any particular instant the motor may not have moved to the exact distance ordered by the command pulses, its end point movement is exactly that ordered by the command pulses.

It is seen that this digital servo performs the function of providing an output motion which is exactly the equivalent ordered by the command pulses. It is to be noted that the motion of the motor 22 is also proportional to the rate of introduction of the command pulses.

Having thus described a particular embodiment of our invention, we claim:

1. A control system for producing a plurality of separate trains of control pulses, including means for generating a first train of uniform electrical pulses at regular intervals with respect to one another; a first multiplier device for multiplying said first uniform train of pulses and an electrical representation of a first number which is proportional to the rate at which it is desired to generate control pulses to produce at its output a second train of electrical pulses which are in number fewer than the number of pulses in said first train and which are spaced at roughly regular intervals with respect to one another; and a second multiplier unit for multiplying said second train of pulses and electrical representations of a plurality of second numbers, each number being proportional to the number of pulses in said second train which it is desired to utilize as control pulses to produce at its output a plurality of separate trains of control pulses, each of which contains fewer pulses than said second train, the control pulses in each of said separate trains being spaced roughly equally with respect to one another.

2. A control system for producing a plurality of separate trains of control pulses, including means for generating a first train of uniform electrical pulses at regular intervals with respect to one another; a first multiplier device for multiplying said first uniform train of pulses and an electrical representation of a first number which is proportional to the number of pulses from said first train which it is desired to utilize, to produce at its output a second train of electrical pulses which are in number fewer than the number of pulses in said first train and which are spaced at roughly regular intervals with respect to one another; a plurality of second multiplier units each multiplying said second train of pulses and electrical representations of a plurality of second numbers which are proportional to the number of pulses in said second train which it is desired to utilize, to produce at their outputs third trains of pulses, each of which contain fewer pulses than said second train, the pulses in each of said third trains being spaced roughly equally with respect to one another; and a third pulse multiplier device having as its inputs said third trains of pulses and having as its output separate trains of control pulses equal in number to said third train of pulses and each containing a number of pulses which is an integral multiple of the number of pulses in one of said third trains.

3. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including, means for generating a first train of uniform electrical pulses at regular intervals with respect to one another; a first device for multiplying said first uniform train of pulses and an electrical representation of a first number which is proportional to the rate at which it is desired to move the object over the resultant path, to produce at its output a second train of uniform electrical pulses which are fewer in number than the pulses in said first train and which are spaced at roughly regular intervals with respect to one another; and second units equal in number to the axes over which said object is to be controlled and each having as one input said second train of pulses and as their second inputs electrical representation of second numbers which are proportional to the coordinates along said axes of said desired motion, and which have as their outputs third trains of control pulses representing products of the inputs, each of which contain fewer pulses than said second train, the pulses in each of said third trains being spaced roughly equally with respect to one another.

4. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including, means for generating a first train of uniform electrical pulses at regular intervals with respect to one another; a first multiplier device for multiplying said first uniform train of pulses and an electrical representation of a first number which is proportional to the rate at which it is desired to control the resultant motion of said object in its travel through a particular distance, to produce at its output a second train of electrical pulses which are in number fewer than the number of pulses in said first train and which are spaced at roughly regular intervals with respect to one another; second multiplier units equal in number to the axes over which said object is to be controlled and each having as one input said second train of pulses and as second inputs electrical representations of second numbers which are proportional to distances along the axes over which it is desired to control the motion of said object, and which have as their outputs third trains of pulses representing a product of their inputs, each of which contains fewer pulses than said second train, the pulses in each of said third trains being spaced roughly equally with respect to one another; and a third pulse multiplier device having as its input said third train of pulses and having as its output fourth trains of control pulses equal in number to said third trains of pulses and each containing a number of pulses which is a function of the number of pulses contained in said second trains and magnitude of said first number.

5. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including, means for generating a first train of uniform electrical pulses at regular intervals with respect to one another; a first multiplier device for multiplying said first uniform train of pulses and an electrical representation of a first number which is proportional to the rate at which it is desired to control the resultant motion of said object in its travel through a particular distance, to produce at its output a second train of electrical pulses which are in number fewer than the number of pulses in said first train and which are spaced at roughly regular intervals with respect to one another; second multiplier units equal in number to the axes over which said object is to be controlled for multiplying said second train of pulses and electrical representations of second numbers which are proportional to the distances along the axes over which it is desired to control the motion of said object, to produce at their outputs third trains of pulses, each of which contains fewer pulses than said second train, the pulses in each of said third trains being spaced roughly equally with respect to one another; and a third pulse multiplier device having as its input said third train of pulses and having as its output fourth trains of control pulses equal in number to said third trains of pulses and each containing a number of pulses which is a function of the number of pulses contained in said third trains and the number of digits contained in said first number.

6. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including, means for generating a first train of uniform electrical pulses at regular intervals with respect to one another; a first multiplier device for multiplying said first uniform train of pulses and an electrical representation of a first number which is a function of the rate at which it is desired to control the resultant motion of said object in its travel through a particular distance, to produce at its output a second train of electrical pulses which are in number fewer than the number of pulses in said first train and which are spaced at roughly regular intervals with respect to one another; a second multiplier unit for multiplying said second train of pulses and electrical representations of second numbers which are a function of coordinates along the various axes of said particular distance over which it is desired to control the motion of said object to produce at its outputs third trains of pulses equal in number to the axes over which said object is to be controlled, each of which contains fewer pulses than said second train, the pulses in each of said third trains being spaced roughly equally with respect to one another; a third pulse multiplier device having as its input said third train of pulses and having as its output fourth trains of control pulses equal in number to said third trains of pulses and each containing a number of pulses which is a function of the number of pulses contained in said second trains and the number of digits contained in said first number; and means for halting the input to said first multiplier device at such time as said first multiplier device has provided a number of output pulses which is a particular function of said second numbers and said first number.

7. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control system, including, means for generating a first train of uniform electrical pulses at regular intervals with respect to one another; a first multiplier device for multiplying said first uniform train of pulses and an electrical representation of a first member which is a function of the rate at which it is desired to control the resultant motion of the said object in its travel through a particular distance, to produce at its output a second train of electrical pulses which are in number fewer than the number of pulses in said first train and which are spaced at roughly regular intervals with repsect to one another; a second multiplier unit for multiplying said second train of pulses and electrical representations of second numbers which are proportional to the coordinates along the various axes of said particular distance over which it is desired to control the motion of said output device, to produce at its outputs third trains of pulses, equal in number to the axes over which it is desired to achieve control and each of which contains fewer pulses than said second train, the pulses in each of said third trains being spaced roughly equally with respect to one another; a third pulse multiplier device having as its inputs said third trains of pulses and having as its output fourth trains of control pulses equal in number to said third trains of pulses and each containing a number of pulses which is a function of the number of pulses contained in one of said second trains and of the number of digits in said first number; and means for halting all of the pulse production processes after reception of a particular number of pulses by said second multiplier unit, such number of pulses being a function of the number of digits contained in the largest of said second numbers and of the number of digits container in said first number.

8. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including, pulse generator circuitry for producing a first train of uniform electrical pulses at regular intervals with respect to one another; a first multiplier device for multiplying said first pulse train and an electrical representation of a number which is proportional to the rate at which it is desired to control the motion of said object over a particular path as its second input, to produce at its output a second train of pulses, lesser in number than the pulses in said first train, spaced at roughly regular intervals with respect to one another, and being in number a function of the number of pulses in said first train and said first number; second multiplier device for multiplying said second train of pulses and second numbers which are proportional to coordinates along various axes of the particular motion which it is desired to achieve, to produce at its output third trains of uniform electric pulses equal in number to the axes over which control is to be achieved, said pulses being spaced at roughly regular intervals with respect to one another, the number of pulses contained in each of said third trains being a function of the number of pulses in said second train and one of said second numbers; a third multiplier device having as its input said third trains of pulses and providing as its output fourth trains of control pulses equal in number to said third trains and each containing a number of pulses which is a function of the number of pulses in one of said third trains and the number of digits contained in said first number; and means for halting said multiplication process after the production of a particular number of said second pulses, said number of pulses being a function of the number of digits in the largest of said second members and the number of digits in said first number.

9. A control system for generating a plurality of separate trains of control pulses, including, pulse generator circuitry for producing a train of uniform electrical pulses at regular intervals with respect to one another; a first multiplier device for multiplying said first train of pulses and an electrical representation of a first number which is proportional to the rate at which it is desired to generate control pulses to produce at its output a second train of pulses spaced at roughly regular intervals with respect to one another, the rate of repetition of said pulses being a function of the rate of repetition of the pulses in said first train and said first number; and a second multiplier device for multiplying said second train of pulses and an electrical representation of second numbers and being operative to provide as outputs third trains of control pulses, equal in number to said second numbers, each of which constitutes a train of uniform pulses spaced at roughly regular intervals with respect to one another, the rate of production of pulses in each of said third trains being a function of the rate of reception of said second pulses and of one of said second numbers.

10. A control system for generating a plurality of separate trains of control pulses, including, pulse generator circuitry for producing a train of uniform electrical pulses at regular intervals with respect to one another; a first multiplier device for multiplying said first train of pulses and an electrical representation of a first number which is proportional to the rate at which it is desired to generate control pulses to produce at its output a second train of pulses spaced at roughly regular intervals with respect to one another, the rate of repetition of said pulses being a function of the rate of repetition of the pulses in said first train and said first number; a second multiplier device for multiplying said second train of pulses and an electrical representation of second numbers and being operative to produce as outputs third trains of control pulses, equal in number to said second numbers, each of which constitutes a train of uniform pulses spaced at roughly regular intervals with respect to one another, the rate of production of pulses in each of said third trains being a function of the rate of reception of said second pulses and of one of said second numbers; and means for halting the operation of said multiplication devices at such time as the total number of pulses produced in each of said third pulse trains is equal to a particular function of the second number applicable to the train.

11. A control system for generating a plurality of separate trains of control pulses, including pulse generator circuitry for producing a train of uniform electrical pulses at regular intervals with respect to one another; a first multiplier device for multiplying said first train of pulses and an electrical representation of a first number which is proportional to the rate at which it is desired to generate control pulses to produce at its output a second train of pulses spaced at roughly regular intervals with respect to one another, the rate of repetition of said pulses being a function of the rate of repetition of the pulse in said first train and said first number; and a second multiplier device for multiplying said second train of pulses and an electrical representation of second numbers and being operative to provide as outputs third trains of control pulses equal in number to said second numbers each of which constitutes a train of uniform pulses spaced at regular intervals with respect to one another and each of which contains a number of pulses which is a function of one of said second numbers.

12. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including pulse generator circuitry for producing a first train of uniform electrical pulses at regular intervals with respect to one another; a first multiplier device for multiplying said first pulse train and an electrical representation of a number which is proportional to the rate at which it is desired to control the motion of said object over a particular path to produce at its output a second train of uniform electrical pulses spaced at roughly regular intervals with respect to one another and occurring at a rate which is a function of the rate of production of said first train of pulses and of said second number; a second multiplier device for multiplying said second train of pulses and second numbers which are proportional to coordinates along the various axes of the particular motion which it is desired to achieve to produce at its output third trains of control pulses equal in number to the axes over which control is to be achieved; said pulses being spaced at roughly regular intervals with respect to one another; and means for halting the operation of said multiplying circuitry when particular numbers of pulses which are functions of said second numbers have been provided in said third pulse trains.

13. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including pulse generator circuitry for producing a first train of uniform electrical pulses at regular intervals with respect to one another; a first multiplier device for multiplying said first pulse train and an electrical representation of a first number which is proportional to the rate at which it is desired to control the motion of said object over a particular path to produce at its output a second train of uniform electrical pulses spaced at roughly regular intervals with respect to one another and occurring at a rate which is a function of the rate of reception of pulses in said first train and said first number; a second multiplier device for multiplying said second train of pulses and second numbers which are proportional to coordinates along the various axes of the particular motion which it is desired to achieve to produce at its output third trains of pulses, said third trains being equal in number to the axes over which it is desired to achieve control, said pulses being spaced at roughly regular intervals with respect to one another, and the rate of production of pulses in each of said third trains being a function of the rate of production of pulses in said second train and one of said second members; a third multiplier device having as its inputs said third trains of pulses and providing as its output fourth trains of control pulses, said fourth trains being equal in number to said third trains and the pulses in said fourth trains occurring at rates which are functions of the rate of repetition of pulses in one of said third trains and the magnitude of said first number; and means for halting said multiplication processes after the occurrence, in said fourth pulse trains of particular numbers of pulses, which numbers are functions of said second numbers.

14. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including pulse generator circuitry for producing a first train of uniform electrical pulses at regular intervals with respect to one another; a first multiplier device for multiplying said first pulse train and an electrical representation of a first number which is proportional to the rate at which it is desired to control the motion of said object over a particular path to produce at its output a second train of uniform electrical pulses spaced at roughly regular intervals with respect to one another and occurring at a rate which is a function of the rate of reception of pulses in said first train and of both the magnitude of said first number and of the number of digits contained in said first number; a second multiplier device for multiplying said second train of pulses and second numbers which are proportional to coordinates along the various axes of the particular motion in which it is desired to achieve to produce at its output third trains of pulses, said trains being equal in number to the axes over which it is desired to achieve control, the pulses in said third trains being spaced at roughly regular intervals with respect to one another, and the rate of production of pulses in each of said third trains being a function of the rate of production of pulses in said second train, and one of said second numbers; a third multiplier device having as its input said third trains of pulses and providing as its output fourth trains of control pulses, said fourth trains being equal in number to said third trains and the pulses in said fourth trains occurring at rates which are functions of the rate of repetition of pulses in one of said third trains and the number of digits in said first number; and means for halting the multiplication processes after the occurrence in said fourth pulse trains of particular numbers of pulses, which numbers are functions of said second numbers.

15. A control system for generating a plurality of separate trains of control pulses for utilization by separate means to simultaneously control the movement of an object along a plurality of separate axes to describe a resultant path, the movement along each axis being through a distance proportional to the number of control pulses in the train utilized and at a speed proportional to the rate of production of said control pulses, said control system, including pulse generator circuitry for producing a first train of uniform electrical pulses at regular intervals with respect to one another; a first multiplier device for multiplying said first pulse train and an electrical representation of a first number which is proportional to the rate at which it is desired to control the motion of said object over a particular path to produce at its output a second train of uniform electrical pulses spaced at roughly regular intervals with respect to one another and occurring at a rate which is a function of the rate of reception of pulses in said first train and of both the magnitude of said first number and of the number of digits contained in said first number; a second multiplier device for multiplying said second train of pulses and second numbers which are proportional to coordinates along the various axes of the particular motion in which it is desired to achieve to produce at its output third trains of pulses, said third trains being equal in number to the axes over which it is desired to achieve control, the pulses in said third trains being spaced at roughly regular intervals with respect to one another, and the rate of occurrence of pulses in each of said third trains being a function of the rate of occurrence of pulses in said second train, and one of said second numbers; a third multiplier device having as its input said third trains of pulses and providing as its output fourth trains of control pulses, said fourth trains being equal in number to said third trains and the pulses in said fourth trains occurring at rates which are functions of the rate of repetition of pulses in one of said third trains and the number of digits in said first number; and means for halting said multiplication processes after the occurrence of a particular number of pulses in said first train, which number is a function of the magnitude of said second numbers and of the number of digits contained in said first number.

16. The structure of claim 12 in which said first and said second multiplier devices each consist of: a serial binary recirculating register; means for inserting the various numbers to be multiplied into said register; means for recirculating the contents of the register; means for receiving the input pulse trains to said multipliers and applying variable time delays to such pulses so as to produce a secondary pulse train in which the pulses are so timed in relation to the emergence of digits from the register that the total number of pulses which occur in the secondary pulse train simultaneously with the emergence of a particular digit from the registers are approximately proportional to the significant position of that digit in said numbers; and an "and" gate having a first input from said source of secondary pulses and a second input from the output of said recirculating register whereby an output pulse is generated by said gate at such times as "one" emerges from said recirculating register simultaneously with the occurrence of a pulse in said secondary train.

References Cited in the file of this patent
UNITED STATES PATENTS

| | | |
|---|---|---|
| 2,833,941 | Rosenberg et al. | May 6, 1958 |
| 2,851,617 | Walker | Sept. 9, 1958 |

OTHER REFERENCES

Numerically Controlled Milling Machine, published by Servomechanisms Laboratory of the Mass. Inst. of Tech., Cambridge, Mass., published May 31, 1953.